United States Patent
Chanclou

(10) Patent No.: US 11,398,869 B2
(45) Date of Patent: Jul. 26, 2022

(54) DEVICE FOR COHERENTLY DETECTING IN A SIMPLIFIED WAY AND WITHOUT OPTICAL LOSS

(71) Applicant: ORANGE, Issy les Moulineaux (FR)

(72) Inventor: Philippe Chanclou, Chatillon (FR)

(73) Assignee: ORANGE, Issy les Moulineaux (FR)

( * ) Notice: Subject to any disclaimer, the term of this patent is extended or adjusted under 35 U.S.C. 154(b) by 0 days.

(21) Appl. No.: 17/436,355

(22) PCT Filed: Mar. 2, 2020

(86) PCT No.: PCT/FR2020/050414
§ 371 (c)(1),
(2) Date: Sep. 3, 2021

(87) PCT Pub. No.: WO2020/178516
PCT Pub. Date: Sep. 10, 2020

(65) Prior Publication Data
US 2022/0149952 A1    May 12, 2022

(30) Foreign Application Priority Data
Mar. 5, 2019   (FR) ...................................... 1902215

(51) Int. Cl.
*H04B 10/61* (2013.01)

(52) U.S. Cl.
CPC ......... *H04B 10/614* (2013.01); *H04B 10/615* (2013.01)

(58) Field of Classification Search
CPC ............................. H04B 10/614; H04B 10/615
See application file for complete search history.

(56) References Cited

U.S. PATENT DOCUMENTS

| | | | | |
|---|---|---|---|---|
| 2011/0255870 A1* | 10/2011 | Grigoryan | ............... | H04J 14/06 398/65 |
| 2014/0099108 A1* | 4/2014 | Yu | .......................... | H04B 10/64 398/205 |
| 2014/0212137 A1* | 7/2014 | Watanabe | ............ | H04B 10/697 398/65 |

(Continued)

OTHER PUBLICATIONS

International Search Report dated Aug. 11, 2020 for corresponding International Application No. PCT/FR2020/050414, Mar. 2, 2020.

(Continued)

*Primary Examiner* — Mina M Shalaby
(74) *Attorney, Agent, or Firm* — David D. Brush; Westman, Champlin & Koehler, P.A.

(57) ABSTRACT

A device for coherently detecting data in an optical signal, called a useful signal, received over a first single-mode optical fibre. The device includes: a second single-mode optical fibre that receives an oscillation optical signal; a polarization-managing device that receives as input either, in a first case, the oscillation optical signal, or, in a second case, the useful signal, and that delivers as output two separate signals, over two single-mode optical guides. The coherently detecting device is configured so that a set of the three signals, which consists of the two separate signals and of either, in the first case, the useful signal, or, in the second case, the oscillation signal, is presented to a single photodiode.

11 Claims, 4 Drawing Sheets

(56) References Cited

U.S. PATENT DOCUMENTS

2014/0341564 A1* 11/2014 Westlund ........... H04B 10/0731
398/16
2016/0261351 A1* 9/2016 Raybon ................. H04B 10/60
2021/0218476 A1* 7/2021 Masuda ........... H04B 10/07951

OTHER PUBLICATIONS

Written Opinion of the International Searching Authority dated Aug. 11, 2020 for corresponding International Application No. PCT/FR2020/050414, filed Mar. 2, 2020.

Sezer Erkilinc M et al, "Comparison of Low Complexity Coherent Receivers for UDWDM-PONs (λ-to-the-user)", arrxiv.org, Cornell University Library, 201 Olin Library Cornell University Ithaca, NY 14853, Nov. 2, 2017 (Nov. 2, 2017), XP080834793.

Ciaramella Ernesto, "Polarization-Independent Receivers for Low-Cost Coherent OOK Systems", Mar. 15, 2014 (Mar. 15, 2014), vol. 26, No. 6, p. 548-551, XP011540387.

International Preliminary Report on Patentability and English translation of the Written Opinion dated Aug. 25, 2021 for corresponding International Application No. PCT/FR2020/050414, dated Mar. 2, 2020.

\* cited by examiner

[Fig 1]
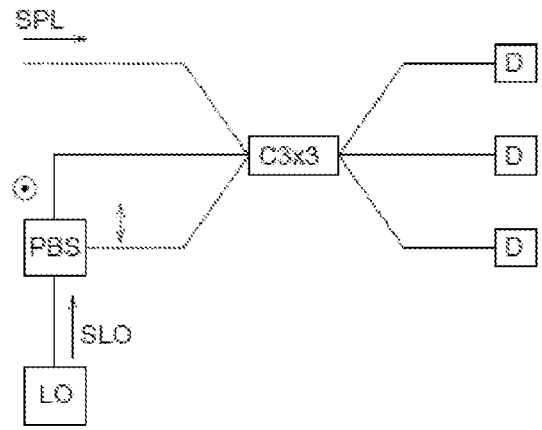
[Fig 2]
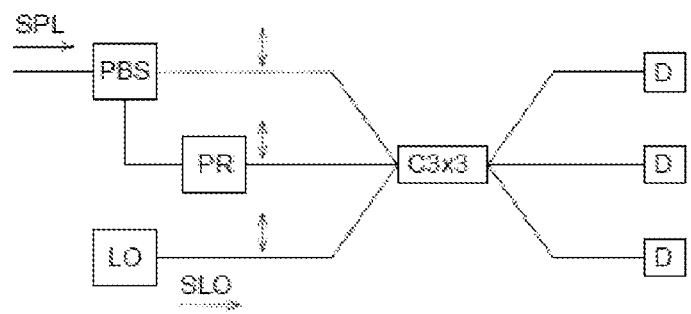

[Fig 3]
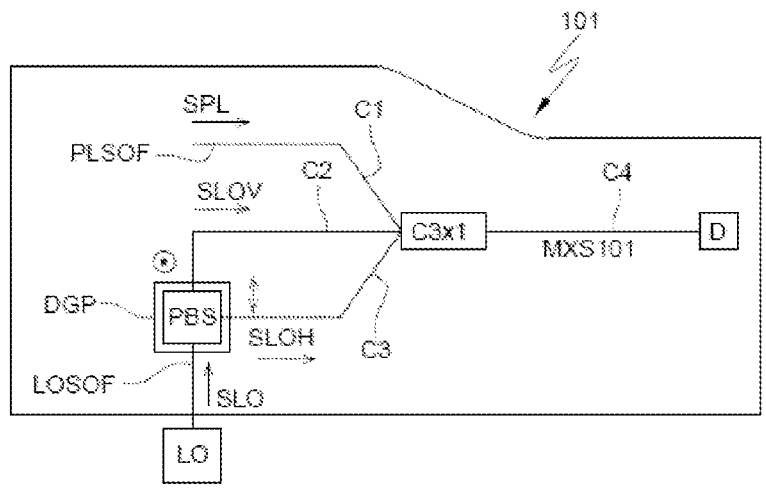
[Fig 4]
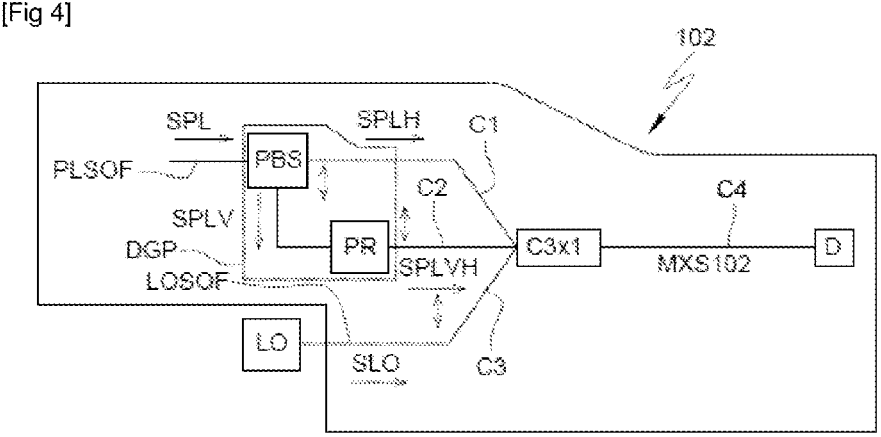

[Fig 5]
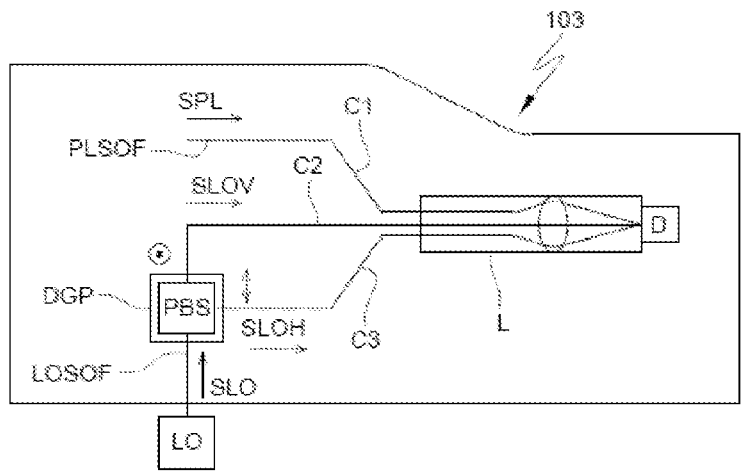
[Fig 6]
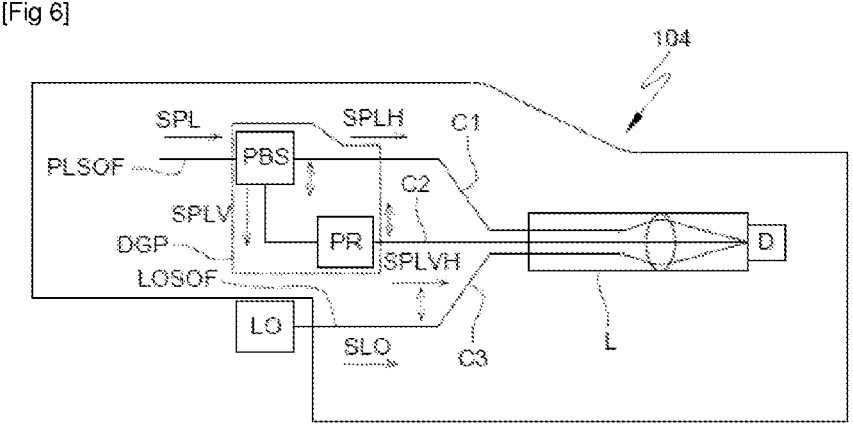

[Fig 7]
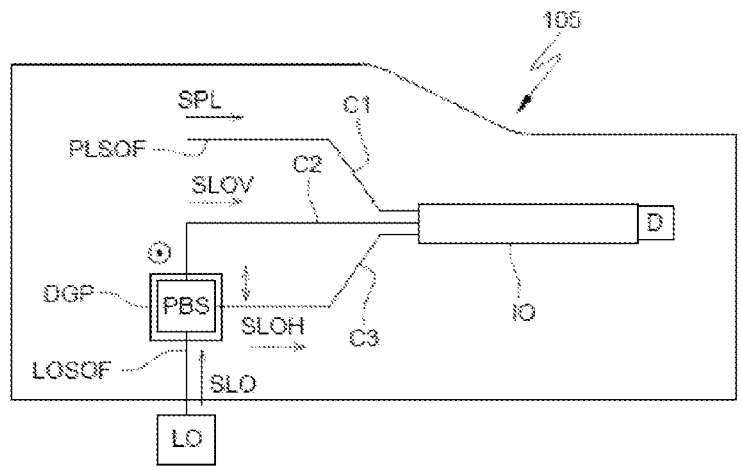
[Fig 8]
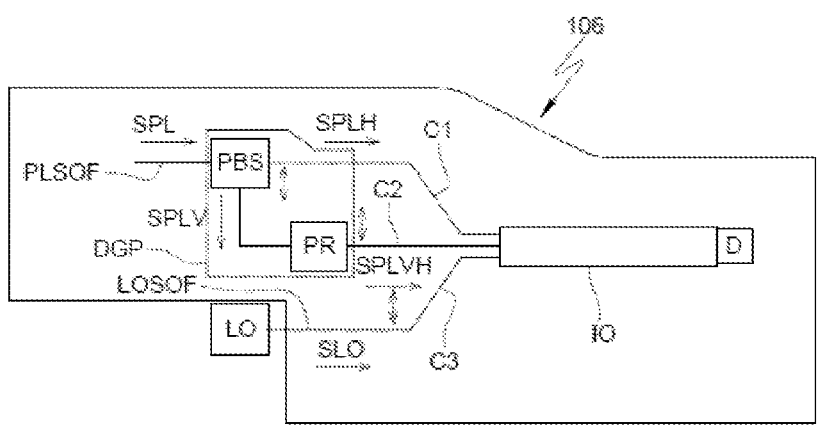

DEVICE FOR COHERENTLY DETECTING IN A SIMPLIFIED WAY AND WITHOUT OPTICAL LOSS

CROSS-REFERENCE TO RELATED APPLICATIONS

This Application is a Section 371 National Stage Application of International Application No. PCT/FR2020/050414, filed Mar. 2, 2020, which is incorporated by reference in its entirety and published as WO 2020/178516 A1 on Sep. 10, 2020, not in English.

1. FIELD OF THE INVENTION

The invention relates to the field of telecommunications via optical fibers, and more particularly to that of optical-signal receivers, such as for example optical line terminals (OLT) or optical network terminals (ONT) used in passive optical networks (PON).

2. PRIOR ART

One of the great difficulties in detection, reception-end, of data conveyed in an optical signal, stems from the attenuation of this signal during its journey through the optical medium. One technique used consists, on the arrival of the signal, in multiplying the optical signal by another optical signal of similar frequency (called the oscillation signal). This multiplication of optical signals is effective only if the two optical signals are on the same polarization axis. It is thus necessary to limit the effect due to the continual variation in the optical state of polarization of the optical signal propagating through the fiber, with respect to the state of polarization of the optical oscillator, which, for its part, remains static. This technique is called coherent optical detection below.

The document "Polarization-independent receivers for low-cost coherent OOK systems" by Ernesto Ciaramella, Photonics Technology Letters, Vol 26, No 6, published Mar. 15, 2014, describes a system providing a solution. This communication system, which is for an optical network, comprises: a light-wave circuit comprising single-mode and multimode optical fibers, and an optical-fiber coupler to form a 3×3 optical combiner with input and output single-mode fibers.

The operating principle of the prior art is based on two set-ups (illustrated by FIGS. 1 and 2, respectively) that allow coherent optical detection, which is based on mixing the received signal with a second optical wave called the "local oscillator", followed by detection by photo-detectors. This optical wave (also called the beat signal, or oscillation signal), which is generated locally in the receiver, is output by the local oscillator (LO), which is so called by analogy with the radio field. The advantage in terms of sensitivity with respect to a direct detection of the signal on a photo-detector is explained by the fact that the power of the detected electrical signal is multiplied by a factor depending on the optical power of the oscillation signal, while the noise inherent to the photo-detector remains unchanged. It will be noted that the optical community calls "mixing" the addition to the received signal of the signal of the local oscillator on a photodetector.

One of the problems of the coherent receivers described above is that it is necessary to control the optical polarization of the input signal to guarantee the condition of coherency of the two waves, i.e. of the received signal and oscillation signal. Specifically, the signal resulting from the multiplication of the optical signal by the oscillation signal depends on the respective optical polarizations of the two signals; it may for example disappear if they are orthogonal. It is therefore necessary to make sure the signals (the received signal and the oscillation signal) have parallel polarization axes. Given the random variation in the state of polarization (SOP) of the signal in the fiber, it is necessary to use, reception-end, an assembly compatible with polarization diversity. In practice, this may be achieved using a polarizing beamsplitter (PBS). The first variant of implementation (FIG. 1) proposes to split the oscillation signal (SLO) into two orthogonal components with a view to achieving mixing that is independent of the SOP of the signal. Regarding the second variant of implementation (FIG. 2), the reverse principle is used, the received signal (SPL) being split into two orthogonal components (via the polarizing beamsplitter PBS) to achieve mixing with a polarized signal SLO. In order for the mixing to take place on a single polarization axis, one of the polarization axes of the polarizing splitter PBS is rotated by 90°. In both variants, the three-to-three coupler C3×3 makes it possible to ensure that, whatever the state of polarization of the received optical signal, it will beat with the signal SLO on a given optical polarization axis. The resulting three optical signals are similar because each corresponds to the same beating of the signal SLO and the signal SPL, and are electronically detected by three photo-detectors D.

This solution has the drawback of attenuating the optical signal delivered to each of the photo-detectors D by about 6 dB, this corresponding to the optical loss of the optical coupler C3×3. Another drawback is the use of three photo-detectors D, making wiring more complex and increasing the cost of the installation.

One of the aims of the invention is to rectify these drawbacks of the prior art.

3. DISCLOSURE OF THE INVENTION

The invention improves the situation using a device for coherent detection of data in an optical signal, called the payload signal, received on a first single-mode optical fiber, comprising:
  a second single-mode optical fiber that receives an optical oscillation signal,
  a polarization management device that receives as input either, in a first case, the optical oscillation signal, or, in a second case, the payload signal, and that delivers as output two split signals, on two single-mode optical guides,
  the coherent detection device being configured so that a set of three signals consisting of the two split signals and either, in the first case, the payload signal, or, in the second case, the oscillation signal, is presented to a single photodiode.

The proposed coherent detection device makes it possible, by virtue of its innovative structure, inter alia, to use only a single photodiode for the conversion of the received optical signal into an electrical signal, rather than 3 according to the prior art. The device is thus more compact, easier to miniaturize and less expensive to produce.

The oscillation signal may be produced outside the device, this having the advantage of increasing its compactness, and of making it possible to use the device in configurations requiring various types of oscillation signal, without having to configure the device itself. According to one aspect, the coherent detection device further comprises a local optical oscillator that delivers the oscillation signal on the second single-mode optical fiber.

Even if the proposed device is more compact and versatile if it does not include the local optical oscillator, it is possible to include it therein, this bringing the device closer to the prior art and therefore making easier the technical modifications to be made to a coherent detection device according to the prior art.

According to one aspect, the signal received as input by the polarization management device is the oscillation signal, and the polarization management device is a polarizing beamsplitter.

By virtue of this aspect, the state of polarization of the signal has no effect on the efficiency of the detection, by virtue of the 2 polarizations of the oscillation signal that are delivered by the polarization management device, which are preferably orthogonal. The polarizing beamsplitter has the advantage of being compact and of generating fewer optical losses than a 1-to-2 optical coupler with 2 polarizers.

According to one aspect, the signal received as input by the polarization management device is the payload signal, and the polarization management device is a polarizing beamsplitter with a polarization rotator connected to one of its outputs.

By virtue of this aspect, the state of polarization of the signal has no effect on the efficiency of the detection because the rotator causes the mixing of the three signals to take place on a single polarization axis. The polarization axes of the three signals are aligned, thus allowing the optical beating to be as effective as possible According to one aspect, the set of three signals is produced by a three-to-one coupler comprising three polarized single-mode inputs and one multimode output.

A single-mode to multimode 3×1 coupler has the advantages of being more efficient, less expensive and more compact than the prior-art 3×3 coupler.

According to one aspect, the set of three signals is produced by an optical lens that focuses the three signals on the photodiode.

With respect to a 3×1 coupler, an optical lens generates no optical losses, but is more complex to manufacture and more fragile.

According to one aspect, the set of three signals is produced by an integrated optic that brings the three signals closer to the photodiode.

The integrated optic also generates no optical losses, and has the advantages of robustness and compactness but requires a geometrically large photo-detection region, this possibly being a disadvantage for very high throughputs.

According to one aspect, the two single-mode optical guides at the output of the polarization management device are single-mode optical fibers.

According to one aspect, the two single-mode optical guides at the output of the polarization management device are integrated optical guides.

This aspect allows a more compact device and a high integration of its components.

Certain of the aspects of the coherent detection device that have just been described are able to be implemented independently of one another or in combination with one another. The invention also relates to a method for coherent detection of data in an optical signal, called the payload signal, received on a single-mode optical fiber, implemented by a coherent detection device such as have just been described, and comprising the following steps:

receiving the payload signal from the first single-mode optical fiber, receiving an oscillation signal from a second single-mode optical fiber, splitting one of the two signals, the oscillation signal in a first case, or the payload signal in a second case, into two signals split, using a polarizing beamsplitter, between two single-mode optical guides, presenting, to a single photodiode, a set of three signals consisting of the two split signals as well as the non-split signal which is either the payload signal in the first case, or the oscillation signal in the second case, detecting with the photodiode the data of the payload signal.

This method applies to the coherent detection device which has just been described, in all its embodiments.

4. PRESENTATION OF THE FIGURES

Other advantages and features of the invention will become more clearly apparent on reading the following description of one particular embodiment of the invention, which embodiment is given by way of simple illustrative and non-limiting example, and the appended drawings, in which:

FIG. 1 schematically shows a first example of a device for coherent detection of data in an optical signal received on a single-mode optical fiber, according to the prior art, FIG. 2 schematically shows a second example of a device for coherent detection of data in an optical signal received on a single-mode optical fiber, according to the prior art, FIG. 3 schematically shows a first example of a device for coherent detection of data in an optical signal received on a single-mode optical fiber, according to one aspect of the invention, FIG. 4 schematically shows a second example of a device for coherent detection of data in an optical signal received on a single-mode optical fiber, according to one aspect of the invention, FIG. 5 schematically shows a third example of a device for coherent detection of data in an optical signal received on a single-mode optical fiber, according to one aspect of the invention, FIG. 6 schematically shows a fourth example of a device for coherent detection of data in an optical signal received on a single-mode optical fiber, according to one aspect of the invention, FIG. 7 schematically shows a fifth example of a device for coherent detection of data in an optical signal received on a single-mode optical fiber, according to one aspect of the invention, FIG. 8 schematically shows a sixth example of a device for coherent detection of data in an optical signal received on a single-mode optical fiber, according to one aspect of the invention.

5. DETAILED DESCRIPTION OF AT LEAST ONE EMBODIMENT OF THE INVENTION

The prior-art operating principle was presented above, with reference to FIGS. 1 and 2, which will not be described again.

FIG. 3 shows a first example of a device for coherent detection of data in an optical signal received on a single-mode optical fiber, according to one aspect of the invention. The detection device 101 comprises a polarization management device DGP, which is for example a polarizing beamsplitter, PBS, a three-to-one single-mode to multimode coupler C3×1, and a photo-detector D, for example a photodiode.

The detection device 101 may also comprise a local oscillator LO, but this oscillator LO may advantageously be an independent and external element connected to the device 101 by a single-mode optical fiber LOSOF.

The single-mode inputs of the C3×1 coupler are connected to three single-mode optical fibers C1, C2 and C3. The multimode output of the coupler C3×1 is connected to a multimode optical fiber C4.

The oscillator LO delivers an oscillation signal SLO, which is presented as input to the polarizing beamsplitter PBS on the single-mode optical fiber LOSOF. The beamsplitter PBS splits the signal SLO into two separate signals, SLOH and SLOV, these two signals based on the signal SLO having different polarizations that are preferably orthogonal to each other. The signals SLOH and SLOV are emitted by the beamsplitter PBS on two of the three single-mode input optical fibers C1, C2 or C3 of the coupler C3×1 (for example C2 and C3 in FIG. 3).

The device 101 is also configured to receive an optical data signal SPL on a single-mode optical fiber PLSOF. That of the three single-mode optical fibers C1, C2 or C3 which is not connected to the two outputs of the beamsplitter PBS (for example C1 in FIG. 3) is the same fiber as the fiber PLSOF.

The three signals SPL, SLOH and SLOV are thus mixed by the coupler C3×1, resulting in a signal MXS101 output by the coupler C3×1 on the multimode optical fiber C4. The multimode fiber C4 conveying the signal MXS101 is connected to the photodiode D.

By virtue of this embodiment, the device 101 allows more efficient detection of the data contained in the signal SPL that it receives as input, because the optical losses between this signal SPL and the MXS101 signal are less than 1 dB.

FIG. 4 shows a second example of a device for coherent detection of data in an optical signal received on a single-mode optical fiber, according to one aspect of the invention. The detection device 102 differs from the device 101 in that the polarization management device DGP comprises a polarizing beamsplitter PBS and a polarization rotator PR.

This second embodiment also differs from the first in that the signal presented to the device PBS is not the oscillation signal SLO but the optical data signal SPL. The beamsplitter PBS splits the signal SPL into two separate signals, SPLH and SPLV, these two signals based on the signal SPL having different polarizations that are preferably orthogonal to each other. The signal SPLV is then presented to the rotator PR, which applies a rotation of 90° to its polarization axis, producing the signal SPLVH. It will be understood that, by virtue of this configuration, the signals SPLH and SPLVH have the same polarization axis.

The signals SPLH and SPLVH are emitted by the combination of the beamsplitter PBS and the rotator PR on two of the three single-mode input optical fibers C1, C2 or C3 (for example C1 and C2 in FIG. 4) of the coupler C3×1. The third single-mode optical fiber (for example C3 in FIG. 4) is the same fiber as the fiber LOSOF.

The three signals SPLH, SPLVH and SLO are thus mixed by the coupler C3×1, resulting in a signal MXS102 output by the coupler C3×1 on the multimode optical fiber C4.

The multimode fiber C4 conveying the signal MXS102 is connected to the photodiode D. By virtue of this embodiment, the device 102 allows, just like the device 101, more efficient detection of the data contained in the signal SPL that it receives as input, because the optical losses between this signal SPL and the MXS102 signal are less than 1 dB.

FIGS. 5 and 7 schematically show examples of a detection device that differs from the device 101 of FIG. 3, on the one hand in the way in which the single-mode optical signals SPL, SLOH and SLOV are mixed, and on the other hand in how the resulting mixture is presented to the photodiode D.

In the device 103 of FIG. 5, the coupler C3×1 and the multimode fiber C4 have been replaced by an optical lens L that brings the three single-mode optical signals SPL, SLOH and SLOV closer together and that focuses them directly on a single photodiode D.

In the device 105 of FIG. 7, the coupler C3×1 and the multimode fiber C4 have been replaced by an integrated optic 10 that brings the single-mode optical signals SPL, SLOH and SLOV closer together so as to illuminate directly the photodiode D.

FIGS. 6 and 8 schematically show examples of a detection device that differs from the device 102 of FIG. 4, on the one hand in the way in which the single-mode optical signals SPLH, SPLVH and SLO are mixed, and on the other hand in how the resulting mixture is presented to the photodiode D.

In the device 104 of FIG. 6, the coupler C3×1 and the multimode fiber C4 have been replaced by an optical lens L that brings the single-mode optical signals SPLH, SPLVH and SLO closer together and that focuses them directly on the photodiode D.

In the device 106 of FIG. 8, the coupler C3×1 and the multimode fiber C4 have been replaced by an integrated optic 10 that brings the single-mode optical signals SPLH, SPLVH and SLO closer together so as to illuminate directly the photodiode D.

The exemplary embodiments of the invention which have just been presented are merely a few of the conceivable embodiments. They show that the invention makes it possible to achieve reception of optical signals, for example emanating from a passive optical network (PON), without significant optical loss. Specifically, in a PON, the optical fibers that connect the optical line terminal (OLT) of the exchange to the various optical network terminals (ONT) of subscribers are single-mode optical fibers. It is therefore advantageous to integrate the proposed detection devices into the ONTs for the downlink, and into the OLT for the uplink.

The invention claimed is:

1. A coherent detection device for coherent detection of data in an optical signal, called a payload signal, the device comprising:
   a single photodiode;
   first and second optical guides;
   a first single-mode optical input configured to be connected to a first single-mode optical fiber for receiving the payload signal;
   a second single-mode optical input configured to be connected to a second single-mode optical fiber that receives an optical oscillation signal; and
   a polarization management device that comprises an input which is connected to, in a first case, the second single-mode optical input for receiving the optical oscillation signal, or, in a second case, the first single-mode optical input for receiving the payload signal, and that comprises first and second outputs which deliver as output two split signals, on the first and second single-mode optical guides, respectively,
   the coherent detection device being configured so that a set of three signals consisting of the two split signals and either, in the first case, the payload signal, or, in the second case, the oscillation signal, is presented to the single photodiode.

2. The coherent detection device as claimed in claim 1, further comprising a local optical oscillator that delivers the oscillation signal on the second single-mode optical fiber.

3. The coherent detection device as claimed in claim 1, wherein the input of the polarization management device is coupled to the second single-mode optical input to receive the oscillation signal, and wherein the polarization management device is a polarizing beamsplitter.

4. The coherent detection device as claimed in claim 1, wherein the input of the polarization management device is coupled to the first single-mode optical input to receive the payload signal, and wherein the polarization management device is a polarizing beamsplitter with a polarization rotator connected to an output of the polarizing beamsplitter.

5. The coherent detection device as claimed in claim 1, wherein the device further comprises a three-to-one coupler comprising three polarized single-mode inputs and one multimode output, which produces the set of three signals.

6. The coherent detection device as claimed in claim 1, wherein the device further comprises an optical lens that produces the set of three signals and focuses the three signals on the photodiode.

7. The coherent detection device as claimed in claim 1, wherein the device comprises an integrated optic that produces the set of three signals and brings the set of three signals closer to the photodiode.

8. The coherent detection device as claimed in claim 1, wherein the first and second single-mode optical guides are single-mode optical fibers.

9. The coherent detection device as claimed in claim 1, wherein the first and second single-mode optical guides are integrated optical guides.

10. A method for coherent detection of data in an optical signal, called a payload signal, received on a single-mode optical fiber, implemented by a coherent detection device, and comprising:
  receiving the payload signal from the first single-mode optical fiber;
  receiving an oscillation signal from a second single-mode optical fiber;
  splitting one of the two signals, the oscillation signal in a first case, or the payload signal in a second case, into two split signals, using a polarizing beamsplitter, between two single-mode optical guides,
  presenting, to a single photodiode, a set of three signals consisting of the two split signals as well as a non-split signal which is either the payload signal in the first case, or the oscillation signal in the second case; and
  detecting with the photodiode the data of the payload signal.

11. A coherent detection device for coherent detection of data in an optical signal, called a payload signal, the device comprising:
  a single photodiode;
  first and second optical guides;
  a first single-mode optical input configured to be connected to a first single-mode optical fiber for receiving the payload signal;
  a second single-mode optical input configured to be connected to a second single-mode optical fiber that receives an optical oscillation signal; and
  a polarization management device that comprises an input which is connected to, in a first case, the second single-mode optical input for receiving the optical oscillation signal, or, in a second case, the first single-mode optical input for receiving the payload signal, and that comprises first and second outputs which deliver as output two split signals, on the first and second single-mode optical guides, respectively,
  a least one optical element, which is coupled to the first and second optical guides and to either the first or second single-mode optical input to receive a set of three signals consisting of the two split signals and either, in the first case, the payload signal, or, in the second case, the oscillation signal, and presents the set of three signals to the single photodiode.

* * * * *